…

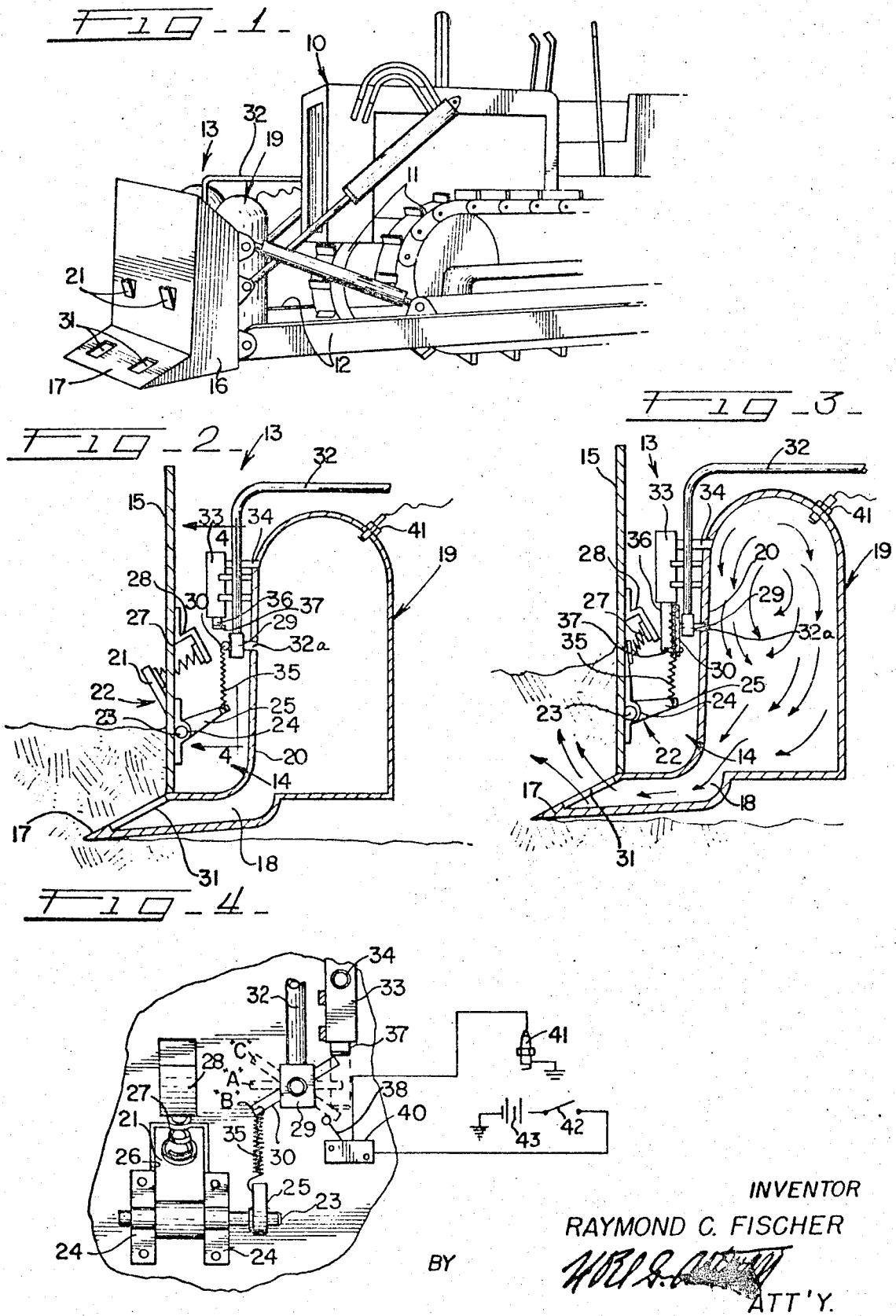

United States Patent Office 3,619,917
Patented Nov. 16, 1971

3,619,917
EARTH MOVING EXPLOSIVE DEVICE
Raymond C. Fischer, Hinsdale, Ill., assignor to International Harvester Company, Chicago, Ill.
Filed Nov. 12, 1969, Ser. No. 875,852
Int. Cl. E02f 5/00; E21c 47/00
U.S. Cl. 37—1
5 Claims

ABSTRACT OF THE DISCLOSURE

A hollow earth working implement has an opening which is closed by the earth it engages and which communicates with a combustion chamber supplied at intervals with a combustible mixture ignited by a spark plug, valve means being provided to automatically control the flow of the combustible mixture to the combustion chamber and valve control means carried by the implement being actuated by the pressure of the soil during movement of the implement to open the valve and discharge the mixture into said chamber. The pressure exerted by the expanding ignited mixture is directed through said opening to loosen and move the dirt allowing the valve to close.

BACKGROUND OF THE INVENTION

This invention relates to earth working implements and particularly to means for improving the efficiency and effectiveness of earth working devices.

There are many soil conditions in which difficulties are encountered by conventional earth movers, such as wet, sticky, or dense soils, sometimes stalling the equipment and requiring other means to loosen the earth to facilitate the earth moving operation. An object of the invention is, therefore, the provision of a novel earth working implement adapted to move soil under adverse conditions.

Another object of the invention is the provision of novel means for moving soil including means forming part of the earth moving device for loosening the soil to be moved.

DESCRIPTION OF THE DRAWINGS

FIG. 1 is a view in perspective of the forward end of a tractor of the crawler type having mounted on its forward end an earth working implement incorporating the features of this invention;

FIG. 2 is a sectional view of the implement of this invention having formed as a part thereof a combustion chamber in which is ignited an air-fuel mixture which is discharged through an opening in the forward part of the implement to loosen the soil to be moved by the implement;

FIG. 3 is a sectional view similar to FIG. 2 showing the relationship of parts of the control mechanism at the moment the combustible mixture in the combustion chamber is ignited; and FIG. 4 is an enlarged section taken on the line 4—4 of FIG. 2 and showing an electrical circuit diagram.

DESCRIPTION OF THE PREFERRED EMBODIMENT

The tractor 10 has a supply, not shown, of combustible fuel and a source of electric current, also not shown. The tractor shown is of the crawler type, having spaced tracks 11 and forwardly extending side arms 12, which it may be understood are pivotally mounted at their rear ends on the tractor for vertical swinging movement.

The earth working implement with which the present invention is concerned is indicated by the numeral 13 and is a tool designed, upon advance of the tractor, to penetrate the soil and operate at a depth substantially below the surface thereof. Implement 13 comprises a generally U-shaped housing 14 having an upright forward wall 15 and rearwardly extending laterally spaced side walls 16. The lower end of front wall 15 is inclined forwardly and downwardly and forms with side walls 16 a V-shaped earth penetrating foot section 17.

As shown in FIGS. 2 and 3, foot section 17 is hollow, forming a compartment 18 communicating with an upright cylindrical chamber 19 having a forward wall 20 spaced rearwardly from wall 15, the latter forming with foot section 17 an earth moving blade.

As earth builds up against the blade 15, as indicated in FIGS. 2 and 3, the soil engages and presses against the outwardly projecting arm 21 of a bellcrank 22, two of which are shown in FIG. 1. Each bellcrank is mounted on a pivot pin 23 carried by a pair of brackets 24 mounted on the inner wall of upright blade portion 15, and each bellcrank has an inwardly directed arm 25.

Each arm 21 projects outwardly through an opening 26 formed in the upright blade portion 15 and is biased outwardly by engagement of arm 21 with one end of a spring 27, the other end of which engages a bracket 28 affixed to the inside of wall 15.

Bellcrank 22 functions to cause an opening of valve 29. Valve 29 is of any suitable construction and performs a function hereinafter to be described.

When the implement 13 initially starts to move the soil, as shown in FIG. 2, a pair of forwardly and upwardly facing discharge ports 31 in the foot section 17 are closed by the compacted soil. During this time, the arm 21 of bellcrank 22 remains biased outwardly and the valve closure member 30 of valve 29 is in a substantially horizontal position as indicated by position A in FIG. 4. With the valve closure member 30 in position A, the valve 29 is in a closed position and non air-fuel mixture is supplied to the chamber 19 through valve 29. The air-fuel mixture is supplied from a suitable compressed air tank and a carburetor, not shown, but of conventional construction, and is fed through tube 32 to valve 29 which communicates with the chamber 19 through inlet 32a.

As the implement continues to move the soil, the soil level rises along the forward wall 15 of the implement 13, as best shown in FIG. 3, causing the arm 21 of the bellcrank 22 to be pushed inwardly against the bias of spring 27, which causes the spring end of arm 25 to move downwardly. The arm 25 is operatively connected to one end of the valve closure rod 30 by means of a spring 35, and as the arm 25 is moved downwardly, due to the soil building up along the implement's forward wall 15, the valve closure rod 30 moves from position A to position B as shown in FIG. 4. In position B valve 29 is opened allowing the air-fuel mixture supplied through tube 32 to enter the combustion chamber 19 through inlet 32a. An energizing means comprising a port 34, cylinder 33, cylinder rod 36, and an arm 37 function to close valve 29 in response to a pressure build-up in chamber 19 and further to actuate the ignition means. Since the discharge ports 31 are covered up with soil, the pressure of the air-fuel mixture steadily builds up in the combustion chamber 19 and the same pressure also builds up in a small cylinder 33 communicating with the chamber 19 through a port 34. As the pressure continues to increase in the chamber 19 and in cylinder 33, cylinder rod 36 begins to extend. The lower end of cylinder rod 36 is provided with a laterally extending arm 37 which is positioned in such a manner as to contact the valve closure rod 30 as the cylinder rod 36 continues to extend under the steadily increasing pressure in the combustion chamber 19 and cylinder 33. As the cylinder rod 37 pushes the valve closure rod from its open position B toward the closed position A the flow of the air-fuel mixture through tube 32 and inlet 32a to the combustion chamber 19 stops. The pressure in the combustion chamber 19 and the cylinder 33 continues to push on the cylinder rod 36 which in turn is acting on the valve closure rod 30 moving it from an open position A to a closed position C causing one end of the valve closure rod 30 to strike an actuating arm 38 of an electrical switch 40, as best shown in FIG. 4, closing the electrical switch 40 completing an electrical circuit energizing the ignition means and igniting the explosive air-fuel mixture by means of a spark plug 41.

As the explosive air-fuel mixture is ignited, the pressure in the combustion chamber is enormously increased and blows the soil out of and away from the discharge ports 31, breaking up the compacted soil into loose easily moved soil fragments. The arm 21 of bellcrank 22 returns to its outwardly biased position, as shown in FIG. 2, allowing the valve closure rod 30 to return to its closed position A and an internal spring, not shown, within the cylinder 33 returns the cylinder rod 36 to its retracted position.

The ignition means is made up of an actuating arm 38, switch 40, spark plug 41, master switch 42 and battery 43 arranged in an electric series circuit. FIG. 4 shows a fundamental electrical circuit for igniting the air-fuel mixture in the combustion chamber 19. The circuit consists of a spark plug 41 which is connected to switch 40. The switch 40 is opened and closed by the action of the valve closure rod 30 as described above. A master switch 42 mounted on the tractor and within the reach of the operator is provided between switch 40 and the source of electrical energy such as the battery 43.

In operation, the tractor operator positions the tractor with the implement 13 in its lowered position and then closes the master switch 42. As the operator moves the implement through the soil, and the soil builds up along the forward wall 15 of the implement, the soil pressure alone starts the cycle described above in which gas is introduced into the combustion chamber, the energizings means is actuated, the ignition means is then actuated, and the air-fuel mixture explodes, causing the earth located in front of the forward wall 15 of the implement 13 to be blown clear of the implement, and into loose particles for easy movement by the implement. The use of a pressure sensitive device as described allows the operator to work in loose soil without having the explosive cycle work because the loose soil does not exert sufficient pressure to rock the bellcrank 22, yet when heavily packed soil is encountered the explosive cycle becomes operative; and, the operator may vary the operating speed of the tractor without manually altering the frequency of the explosive cycle.

For relatively wide implements such as bulldozers and the like, additional combustion chambers, discharge ports, and operating means therefor may be provided.

It is believed that the construction and operation of the novel earth working apparatus of this invention will be clearly understood from the foregoing description.

What is claimed is:

1. An earth working implement adapted for attachment to a tractive vehicle having a fuel supply and a source of electric current, said implement comprising a housing having a receiving chamber for a combustible fuel and a hollow earth penetrating section communicating with said receiving chamber, valve means having an open and a closed position connected to said chamber for controlling the feeding of fuel to said chamber, valve control means mounted on said implement and operative for moving said valve means from valve closed to valve open positions, said valve control means including a soil engaging portion being actuated in response to an increase in soil pressure against the said soil engaging portion, ignition means operatively connected with the interior of said receiving chamber, energizing means responsive to a build up of pressure within said chamber for closing said valve means and actuating said ignition means to ignite said fuel, said earth penetrating section having therein an exhaust outlet for ignited fuel wherein the explosive force of the expanding ignited fuel loosens and displaces the soil in front of the implement and relieves the soil pressure against said valve control means.

2. The invention set forth in claim 1, wherein said valve control means includes a bellcrank pivoted on the implement and having one arm projecting forwardly therefrom for engagement by the soil, another arm having an operating connection with said valve means and spring means connected between the implement and said one arm for biasing the bellcrank in one direction about its pivot.

3. The invention set forth in claim 2, wherein said energizing means include a cylinder and piston unit in which the cylinder is in communication with said chamber to extend the piston rod in response to the charge pressure of said fuel, said piston rod operative when extended to engage said valve control means causing said valve means to move to a valve closed position, and to energize said igniting means, igniting the fuel.

4. The invention set forth in claim 3, wherein the earth penetrating section of said implement is generally V-shaped and projects forwardly from the lower end of said chamber and a generally vertical block extends upwardly from said earth penetrating section spaced forwardly from said chamber.

5. The invention set forth in claim 4, wherein said bellcrank is mounted on said blade, said one arm of said bellcrank projecting forwardly from said blade and said other arm projecting rearwardly therebetween and said chamber.

References Cited
UNITED STATES PATENTS

| | | | |
|---|---|---|---|
| 3,451,149 | 6/1969 | Munsch | 37—129 |
| 3,461,577 | 9/1969 | Clark et al. | 37—1 |
| 3,541,709 | 11/1970 | Comer et al. | 37—141 |
| 3,574,404 | 4/1971 | Hogan | 299—37 |

ROBERT E. PULFREY, Primary Examiner

C. W. HANOR, Assistant Examiner

U.S. Cl. X.R.

37—18; 102—23; 299—37; 175—14